Figure 1:
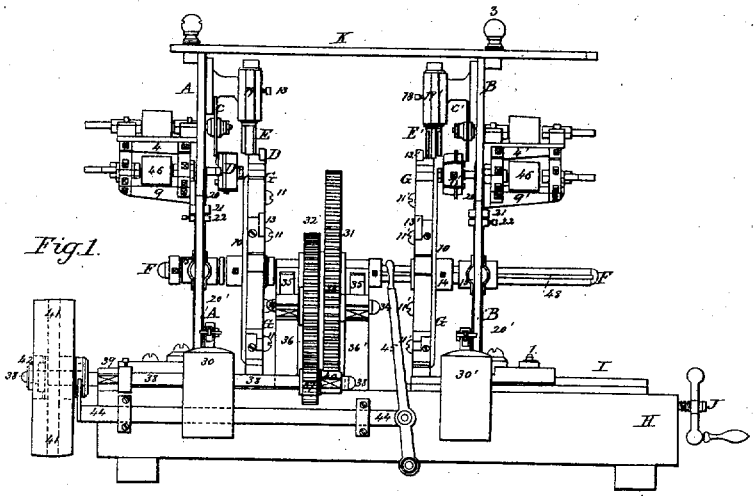
Figure 4:
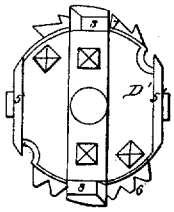
Figure 7:
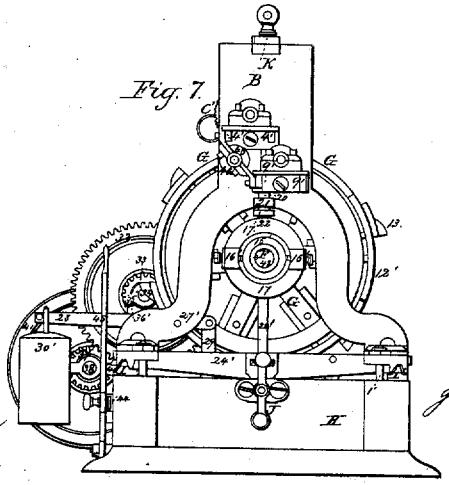
Figure 2:
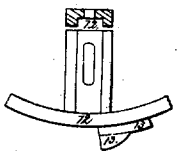
Figure 5:
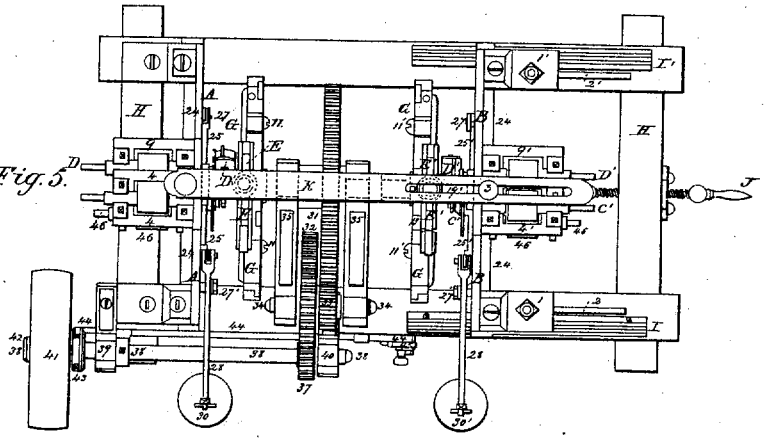
Figure 8:
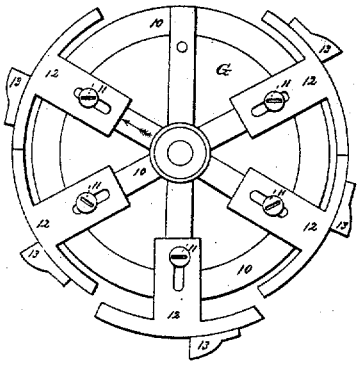
Figure 3:
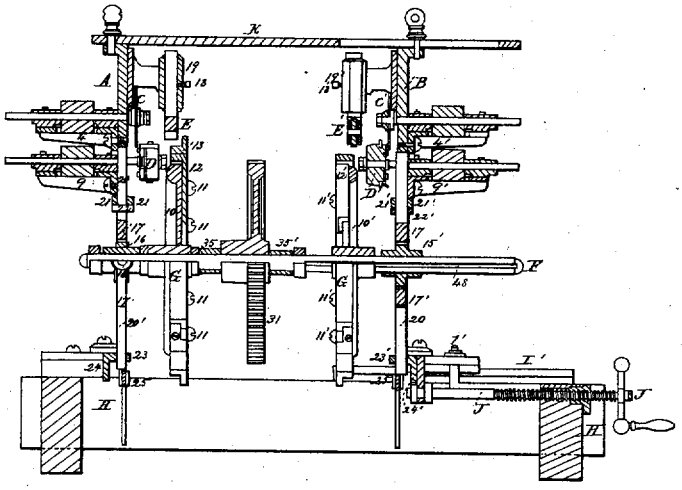
Figure 6:
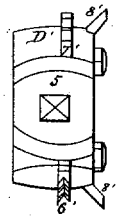
Figure 9:
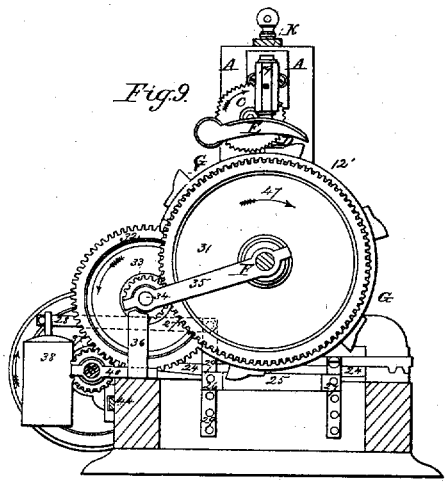

3 Sheets-Sheet 1.

J. E. Warner,

Crozing Staves.

No. 1,713. Reissued June 28, 1864.

Witnesses.
Ja. J. Wightman
W. L. Bennem

Inventor.
Jonathan E. Warner
by his attorney
E. S. Renwick

AM. PHOTO-LITHO. CO. N.Y. (OSBORNE'S PROCESS)

3 Sheets-Sheet 2.

J. E. Warner,

Crowing Stares.

No. 1,713. Reissued June 28, 1864.

Witnesses.
Ja. S. Wightman
H. L. Bennett

Inventor:
Jonathan E. Warner
by his Attorney
E. S. Renwick

AM. PHOTO-LITHO. CO. N.Y. (OSBORNE'S PROCESS)

3 Sheets-Sheet 3.

J. E. Warner,

Crozing Staves.

No. 1,713. Reissued June 28, 1864.

Witnesses.
Jas. S. Wightman
W. L. Bennett

Inventor,
Jonathan E. Warner
by his Attorney
E. S. Renwick

AM. PHOTO-LITHO. CO. N.Y. (OSBORNE'S PROCESS)

UNITED STATES PATENT OFFICE.

JONATHAN E. WARNER, OF BOSTON, MASSACHUSETTS.

IMPROVEMENT IN STAVE-MACHINES.

Specification forming part of Letters Patent No. 10,242, dated November 15, 1853; Reissue No. 1,713, dated June 28, 1864.

*To all whom it may concern:*

Be it known that I, JONATHAN E. WARNER, of Boston, in the county of Suffolk and State of Massachusetts, have invented a new and useful machine for finishing the ends of staves, which I denominate a "Working-Off Machine;" and I do hereby declare that the following is a full, clear, and exact description of the construction and operation of the same, reference being had to the accompanying drawings, making a part of this specification, in which—

Figure I is a longitudinal elevation of the machine; Fig. III, a longitudinal section of it; Fig. V, a ground plan of it; Fig. VII, an end elevation of it; Fig. IX, a transverse section of it; Fig. VIII, a detached and enlarged elevation of the rotary feed-bed; Fig. II, an elevation and section of one of the segments of Fig. VIII; Fig. IV, a detached and enlarged view of the cutter-head, and Fig. VI an end elevation of Fig. IV.

Similar letters and figures refer to similar parts in each of the figures.

The object of this invention is to finish the two ends of a stave simultaneously, which includes the distinct operations of cutting the staves to the proper length, beveling the ends, reducing the ends to the required thickness, or howeling and cutting the groove within which the edges of the head are to rest, or crozing. The four combined operations are technically known as "working" off, and are usually performed after the cask is set up, and by hand-labor, to avoid which is the object of the machine invented by me.

The invention consists of a number of parts, the first of which consists of the combination of certain clamps with a revolving beveling-cutter, and also without a revolving howeling-cutter, and also with a revolving crozing-cutter, the peculiarities of said clamps being that they are of proper construction to support the interior surface of the stave, and are combined with an axis which is at substantially the same distance from the position of the stave as the axis of the barrel or cask of which the stave is to form a part.

The second part of the invention consists of the combination of several pairs of clamps for the interior surfaces of separate staves with one axis, so as to form a revolving clamp carriage or bed, to present the staves, one by one, to the cutters, and to carry the staves past the cutters, so that one stave may be applied to the interior supporting-clamps while another is being worked off.

The object of the third part of the invention is to permit staves of different thicknesses to be dressed up in such manner that the dressed-up portions will always bear the same relation to the exterior surface of each stave, however the original thicknesses of the staves may have varied. This part of the invention consists of the combination of dressing-up cutters with clamps for holding the exterior surface of the stave, which, at the times the staves are being dressed up, are held at the same radial distance from the cutters, or are then unyielding, and with yielding turning clamps or holders for the interior surface of the stave, which can be turned upon an axis corresponding substantially with that of the barrel, to present the staves to the cutters and yield to adapt themselves to the varying thicknesses of the staves.

The fourth part of the invention consists of the combination of clamps or holders for the the interior surface of the stave, arranged to turn on an axis which is at substantially the same distance from the position of the stave as the axis of the barrel to be made, with clamps for the exterior surface of the stave, and with revolving cutters for beveling, howeling, and crozing the two ends of a stave, so that the two ends of a stave may be dressed up without taking the stave from between the clamps.

The fifth part of the invention consists of the combination of the aforesaid internal clamps arranged to turn on an axis, as aforesaid, and of said exterior clamps with two sets of revolving cutters, one for dressing up each end of the staves, as aforesaid, and with two circular saws for sawing the ends to the required length, so that the stave can be worked off at both ends by applying it once to the machine.

The sixth part of the invention consists of the combination of the bearings of the arbors of the cutter-heads for dressing up the ends of the staves and the internal and exterior clamps with each other in such manner that they can be adjusted in the direction of the length of the stave to adapt the machine to dressing up staves for barrels or casks of different lengths.

The seventh part of the invention consists of the combination of the clamps for the interior surface of the stave with the axis on which they turn, and by which they are sustained, in such manner that the former may be adjusted radially to adapt the machine to dressing up staves for barrels or casks of different diameters.

To enable others skilled in the art to make and use my invention, I will proceed to describe the construction and operation of a machine embodying all its parts.

In the accompanying drawings, A and B represent two upright frames for supporting the arbors of the circular saws C and C′, the cutter-heads D and D′, the clamps E and E′, and the axis F of the rotary clamp-bed G, the frame A being firmly bolted to the bed H, and the other, B, admitting of motion laterally on the guides I and I′, attached to the bed H by means of the screw J, and secured at any given distance from A by the bolts 1 and 1′, which pass downward through the slots 2 and 2 in the bed H. The tops of the frames are steadied by the horizontal link K, which is fast at A, and slotted, as seen in Fig. V, to permit the bolt 3 in the top of the frame B to move therein. By tightening the bolt 3 the top of B is connected firmly to A.

The saws C and C′ are of the ordinary circular kind, and are secured to arbors which revolve in bearings supported by the brackets 4 and 4′, which are bolted to A and B. To the cutter-heads D and D′ (shown detached and enlarged in Figs. IV and VI) are bolted the curved-edge or howeling cutters 5 and 5′, the gage-cutters 6 and 6′, the crozing-saws 7 and 7′, and the inclined cutters 8 8, and 8′ 8′, which severally reduce the thickness of the stave at the ends, define the limits of and cut the grooves for the heads, and bevel the ends of the stave. These heads are attached to revolving arbors, which revolve in bearings supported by brackets 9 and 9′, in the same manner as the saws C and C′.

To obtain a simple, uniform, and constant feeding apparatus, and also to combine therewith the means of so carrying the staves that the form of the surface left by the revolving cutters in the heads D and D′ should be similar to the required internal figure of the ends of the cask, I have devised the turning, yielding, and expanding clamp carriage or bed G, which is shown detached and enlarged in Fig. VIII. It consists of two similar frames, 10 and 10′, to the radial arms of which are attached by bolts 11 and 11′ the movable segments 12 and 12′, which constitute the clamps for the interior surface of the stave. Each segment carries a stop, 13, against which the stave rests. By moving the clamps on the radial arms the radius of the clamps may be made substantially the same as the required internal radius of the head of the cask. The two frames are placed upon a shaft, F, the one, 10, being fixed and the other, 10′, movable and held at any required distance from the first, 10, by the screw 14, which is guided by the groove 48 in the shaft F, and retains the opposite stops 13 and 13′, Fig. I, of the clamps always in a position parallel with the axis F and at right angles with the saws and cutter-heads. The shaft F is supported so that it may be turned by and turns in the bearings 15 and 15′ within the frames A and B. These bearings are of the kind known as "swivel-bearings," and vibrate on the screws 16 and 16′, as seen in Fig. VII, within the rings 17 and 17′. Outside of the turning clamp-bed are placed the spindles of the curved clamps E E′, for the exterior surface of the staves, which clamps can be set at any radial distance from the path of the cutters in the heads D and D′, which the required thickness of the stave demands by means of the screws 18 and 18′, which pass through the shells of the sockets 19 and 19′. These sockets are bolted to the frames A and B, as seen in Figs. I, III, V, and IX. The axis of the rotary clamp-bed has a yielding vertical movement, so that when a stave is presented by the revolving clamp-bed to the saws and cutters the axis lowers to permit the internal clamps, 12 12′, to yield and adapt their positions to the thickness of each end of the stave. The mechanism by which the internal clamps are made to yield to inequalities in the thickness of staves is best seen in Figs. III, V, VII, and IX. To the opposite side of the rings 17 and 17′ are fixed the spindles 20 and 20′, Figs. III and VII. The upper ones, 20, pass through the eyes 21 and 21′ in the frames A and B, and have collars 22 and 22′, movable upon them to prevent the axis from being raised too high. The lower ends of the spindles 20′ slide through the eyes 23 and 23′, Fig. III, of the stretchers 24 and 24′, and rest on the horizontal levers 25 and 25′, Figs. III and IX. 25, Fig. IX, is one of a system of levers composed of the movable fulcrums 26 and 27, the fixed fulcrums 27′, the levers 25 and 28, and the link 29. To the levers 28 and 28′ are hung the weights 30 and 30′, by the gravity of which, acting through the system of levers, the axis of the turning bed is raised until the collars 22 and 22′ strike the eyes 21 and 21′, or the passing stave, pressed against the curved exterior clamps, E and E′, prevents further movement. The internal clamps may be forced against the inner surface of the stave by springs instead of by weights.

The turning of the bed is accomplished by a train of gearing—viz., 31 on the shaft F, 32 and 33 on the shaft 34, and kept in contact with the gear 31 by the radius-bars 35 and 35′, the ends of the bars resting on the props 36 and 36′, Fig. I, and finally the pinion 37 on the shaft 38. The shaft 38 revolves in the bearings 39 and 40, and carries the loose pulley 41. The pulley 41 is thrown into connection with its shaft by pins on its face being brought in contact with similar pins or projections on the side of the circular plate 42, (seen in dotted lines in Fig. I.) said pulley being moved laterally on the shaft 38 in the usual manner by the fork 43, embracing a groove in the hub of the pulley, the shipper-bar 44, and the lever 45.

To bring the machine into action the circular saws are first set to the required length of the staves by moving the frame B on its bed. The curved exterior clamps, E and E′, are then set to position, as described. The saws and cutters are made to revolve by a belt, which passes under the carrier-pulleys 46 and 46′, over the pulleys on the saw-arbors, and under the pulleys on the cutter-head arbors, thence uniting with the other end over the main driving pulleys. The loose pulley 41 is then thrown into gear by the clutch arrangement, and a rotary motion being given to the bed G, a stave applied to the interior clamps, 12 12′, of the bed G, parallel with its axis F, will be carried by the stops 13 in the direction of the arrow 47, Fig. IX, under the exterior clamps, E and E′, to the saws and cutters, the outer side of the stave being pressed against the exterior clamps, E and E′, by the action of the weights 30 and 30′ upon the turning clamp-bed G. The stave, having passed from under the exterior clamps E, and E′, and being unsupported, falls from the bed. Other staves are laid upon the bed as often as the several clamps and stops 13 and 13′ come around to the operator.

Although the rotary bed which I have shown in the drawings and described herein is the arrangement preferred by me for general use, still I do not confine myself to its particular detail, as described, for in some cases I may prefer to make several frames of different diameters corresponding to different diameters of casks, any two of which of the same diameter may be put upon the shaft F in place of the frames with movable clamps.

Having thus described a machine embodying my invention, I state that I do not claim as of my invention any mechanism which acts to croze, howel, or chamfer staves after they are set up and hooped or trussed, my invention having been devised to obviate difficulties incident to the use of such machines; but I do claim as of my invention—

1. Clamps which support the interior surface of a stave and are combined with and turn on an axis which is at substantially the same distance from the position of the stave as the axis of the barrel of which the stave is to form a part, substantially as set forth, in combination with a revolving cutter for beveling the end of a stave, and also in combination with a revolving cutter for howeling the end of a stave, and also in combination with a revolving crozing-cutter, each acting on the stave substantially as described.

2. Pairs of clamps mounted and turning on an axis having the relation to the barrel described, whereby one stave may be adjusted in readiness for working off on one pair of clamps while another stave, supported in another pair of clamps, is being worked off by revolving cutters, as specified.

3. The combination of dressing-up cutters with unyielding exterior clamps for the stave to be dressed up, and with yielding internal clamps turning on an axis substantially the same as that of the barrel to be formed by the stave, all being and operating substantially as set forth.

4. The combination of exterior and internal clamps for the stave, which latter turn on an axis located with reference to the stave substantially as described, with revolving cutters for beveling, howeling, and crozing the two ends of the stave without removing it from between the clamps, all being and operating substantially as set forth.

5. The combination of exterior and interior clamps for the stave, the latter turning on axis located with reference to the stave as described, with two sets of revolving cutters and two circular saws, all being and operating substantially as set forth, so that the stave may be worked off by applying it once to the machine.

6. Cutter-heads and exterior clamps which are adjustable lengthwise of a stave, substantially as described, in combination with interior clamps, also adjustable lengthwise of the stave, as set forth, whereby staves of different lengths may be worked off in the same machine, as specified.

7. The combination of the internal clamps for the stave, with their axis in such manner that they may be adjusted radially, substantially as set forth.

In witness whereof I have hereunto set my hand.

JONATHAN E. WARNER.

Witnesses:
GERARD A. TOBEY,
GEORGE D. CLARK.